United States Patent [19]

Weitzen et al.

[11] 4,284,511
[45] Aug. 18, 1981

[54] PROCESS FOR USING MAGNETICALLY BALLASTED SORBENTS

[75] Inventors: William Weitzen, Bethesda, Md.; Jerry C. Trippe, Fairfax Station, Va.

[73] Assignee: General Technology Applications, Inc., Rosslyn, Va.

[21] Appl. No.: 71,040

[22] Filed: Aug. 30, 1979

[51] Int. Cl.³ .................................. B01D 15/02
[52] U.S. Cl. ................................ 210/661; 210/675; 210/679; 210/682; 210/688
[58] Field of Search .................. 148/31.55, 31.57; 210/20, 30 R, 32, 36, 37 B, 38 B, 38 C, 40, 502, 503, 504, 506, 661, 675, 679, 682, 688; 252/430, 470; 428/407, 900

[56] References Cited

U.S. PATENT DOCUMENTS

| | | | |
|---|---|---|---|
| 2,642,514 | 6/1953 | Herkenhoff | 210/30 R |
| 2,742,381 | 4/1956 | Weiss et al. | 210/20 |
| 2,932,552 | 4/1960 | Weiss et al. | 210/37 B |
| 3,560,378 | 2/1971 | Weiss et al. | 210/36 |
| 3,650,949 | 3/1972 | Hager et al. | 210/37 B |
| 3,788,933 | 1/1974 | Fries | 210/37 B |
| 3,803,033 | 4/1974 | Sutherland | 210/40 |
| 4,134,831 | 1/1979 | Dawson et al. | 210/36 |
| 4,168,971 | 9/1979 | Szczepanski | 210/38 B |

OTHER PUBLICATIONS

Bozorth, R. M. *Ferromagnetism*, D. Van Nostrand Co., Inc., N.Y., 1951, pp. 226-227.
Chemical Engineers' Handbook, John H. Perry (editor), 4th ed., McGraw-Hill, 1963, pp. 5-62.

*Primary Examiner*—Ivars C. Cintins
*Attorney, Agent, or Firm*—Fidelman, Wolffe & Waldron

[57] ABSTRACT

Solid sorbents such as activated carbon and ion exchange resins are ballasted with finely divided particles of a non-corrosive, magnetic iron-chromium alloy to increase their effective specific gravity and to render them recoverable by magnetic means. The sorbents are used to selectively extract one or more constituents contained in a liquid as by contacting in a multi-stage fluidized bed.

15 Claims, 1 Drawing Figure

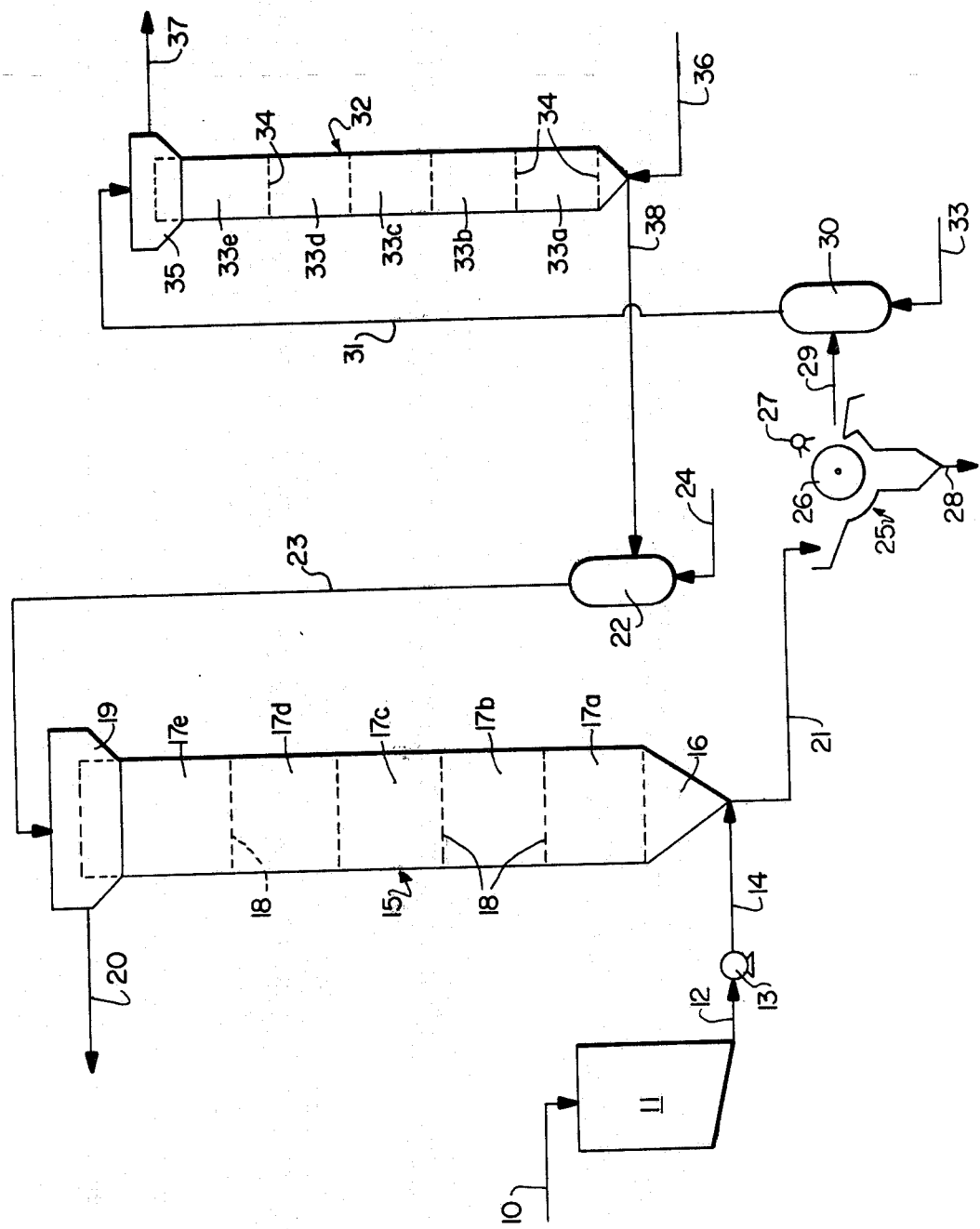

PROCESS FOR USING MAGNETICALLY BALLASTED SORBENTS

BACKGROUND OF THE INVENTION

This invention relates to the magnetic ballasting of granular, solid sorbents to increase their effective specific gravity and to render the sorbents magnetically recoverable from a liquid.

Another aspect of this invention relates to the use of magnetically ballasted solid sorbents in the fluidized bed extraction of selected constituents from a liquid.

A specific aspect of this invention relates to the sorption and recovery of heavy metal ions from aqueous solution using a multi-stage fluidized bed contactor.

Solid sorbents such as activated carbon granules and organic ion exchange resins are well known and have long been used in a large variety of extraction and purification processes. Specific examples of activated carbon use include the removal of organics from water as in the tertiary treatment of sewage effluents and the adsorption of gold from cyanide solutions. Ion exchange resins have found use in the selective extraction of metal ions from solution and, in the field of extractive metallurgy, are gaining prominence in the extraction and recovery of uranium from leach liquors.

Liquid-solid contacting systems used in sorption processes employing both activated carbon and ion exchange resins conventionally include fixed bed and pulsed bed, often referred to as moving bed, processes. In the fixed bed process, liquid is introduced into the top of a column loaded with sorbent and is dispersed evenly over the bed top by a distribution system.

Process liquid is removed from the bottom of the column. When the sorbent bed becomes exhausted, it is sluiced from the column for regeneration or disposal. The pulsed bed process operates similarly but periodically a portion of the sorbent is sluiced from the bottom of the column and an equal amount of fresh sorbent is introduced into the top of the column.

With whatever sorption media is used, these techniques suffer from uneven flow, or channeling, of liquid through the bed thus decreasing the efficiency of the process. In addition, these processes require that the liquid being treated be essentially free of suspended solids. The sorption media acts as a filter to remove suspended solids from the liquid resulting in plugging of the bed and/or severe channeling. These problems are compounded with certain ion exchange resins which swell significantly during the exchange process.

The process constraints imposed by fixed and moving bed sorption techniques have long been appreciated and efforts to develop fluidized bed sorption processes date back more than twenty years. Probably the most advanced of these is the NIMCIX system which is based on the work of Cloete and Streat as further developed by The National Institute for Metallurgy of Randberg, South Africa. Use of the NIMCIX system for the extraction and recovery of uranium using particular ion exchange resins has been successfully demonstrated on a relatively large scale. This work is described in the following two articles:

Haines, A. K., The Development of Continuous Fluidized-Bed Ion Exchange in South Africa, and Its Use in the Recovery of Uranium, *Journal of the South African Institute of Mining and Mettalurgy*, July 1978, pages 303–315.

Craig et al, The Design and Operation of a Continuous Ion-Exchange Demonstration Plant for the Recovery of Uranium, *Journal of the South African Institute of Mining and Metallurgy*, July, 1978, pages 316–324.

Liquid flow velocities of about 30 cm/minute were achieved when operating on a liquid having a suspended solids content of 200 to 500 ppm. In addition, some preliminary work was carried out on slimes in which it was determined that the solids content of the liquid was limited to about 10% by the density of the commercially available resins. Higher solids content causes entrainment of the resin granules in the liquid. The Haines article also notes that attempts have been made to produce ion exchange resins of higher specific gravity but that "the heterogeneous materials that were synthesized have not achieved commercial success owing to problems of chemical and physical instability."

Activated carbon having magnetic properties is also known as is described in U.S. Pat. No. 3,803,033. That patent discloses powdered activated carbon having particles of magnetic iron oxide ($Fe_3O_4$) adhering to the carbon. It is used for the adsorption of organic contaminants from water streams, such as sewage effluent, by slurrying the carbon in the water and thereafter removing carbon from the water by magnetic means.

Dawson et al in U.S. Pat. No. 4,134,831 discloses adsorbents and ion exchange media having attached thereto or incorporated therein magnetically susceptible materials such as ground natural magnetite. Patentees also suggest use of iron filings as the magnetic material but it must be noted that iron filings would very quickly react in most process environments to form either very weakly magnetic or non-magnetic ferrous and ferric oxides. The magnetic media is proposed for use in such processes as the underwater mining of minerals by dispersing the media in the bottom sediments of the water body and thereafter collecting the media by drawing a magnet through the water.

SUMMARY OF THE INVENTION

Substantially increased liquid flow rates are achieved in fluidized bed contacting processes by magnetically ballasting the sorbent granules with finely divided particles of a non-corrosive, magnetic, iron-chromium alloy. A sufficient concentration of alloy particles is incorporated in the sorbent granules to insure ready extraction of the granules from liquid by magnetic means and to increase the effective specific gravity of the granules so as to provide a settling velocity in the liquid stream being treated of at least about 30 cm/min.

The magnetically ballasted sorbent granules find particulare use in the multi-stage fluidized bed contacting of process streams containing relatively high concentrations of suspended solids to recover metal values therefrom.

Hence, it is an object of this invention to provide a process for using magnetically ballasted sorbent granules of relatively high specific gravity.

It is a further object of our invention to provide an improved process for the fluidized bed contacting of process streams, especially those streams containing large amounts of suspended solids.

One specific object of our invention is to provide a process for the recovery of gold from cyanided slimes in a fluidized bed process using a magnetically ballasted activated carbon sorbent.

Another specific object of our invention is to recover uranium from leach solutions containing relatively high concentrations of suspended solids in a fluidized bed process using a magnetically ballasted organic ion exchange resin.

BRIEF DESCRIPTION OF THE DRAWING

The FIGURE illustrates a flowsheet of an exemplary embodiment of the invention.

GENERAL DISCUSSION OF THE INVENTION

Sorption processes, including adsorption per se and ion exchange, have long been well established in water treatment and are now gaining prominence in extractive metallurgy; especially the extractive metallurgy of gold and uranium. While the advantages of sorption processes in extractive metallurgy have long been recognized, adaptation of contacting techniques used in water treatment has not been overly successful when applied to metallurgical streams.

Aqueous streams derived from extractive metallurgical processes contain metal values in solution but also typically contain suspended solids ranging up to 40–50% by weight of the solution. Particle sizes of the suspended solids contained in some streams can range downwardly to as small as a few microns. Passage of such solids-containing streams through the typical fixed bed or moving bed adsorption column results in almost immediate plugging of the bed. Attempts to clarify the streams by removal of the suspended solids prior to adsorption or ion exchange results in loss of metal values in the liquid retained in the pulp, or solids fraction.

One approach that has been developed to adapt adsorption processes to solids-containing streams is the carbon-in-pulp process. This process comprises the cyanide leaching of gold ore pulps after which gold is removed from the pulp without a prior liquid-solid separation by contacting the pulp with activated carbon in a multiple stage, counter-current system of agitators and screens. Granular carbon, typically minus 6, plus 16-mesh size, is advanced between stages after separating it from the much finer pulp using vibrating screens and gold-loaded carbon is recovered from the final adsorption stage in the same fashion.

Although care is taken to select carbons having the highest possible resistance to abrasion and breakage, substantial size reduction of the carbon granules does occur in the adsorption circuit. Carbon particles which are abraided to sizes smaller than the transfer or recovery screens (typically 24 mesh) are irretrievably lost to the waste of barren pulp. Loss of carbon in this manner represents a serious gold loss as well as the carbon carries adsorbed gold in concentrations ranging from a few ounces to a few hundred ounces of gold per ton of carbon.

Fluidized bed contacting processes are well adapted for use with process streams containing suspended solids. However, granular sorbents normally used in extractive metallurgy processes, i.e., activated carbon in gold and silver extraction and polyurethane and similar resins in uranium extraction, have a low effective specific gravity. In liquid fluidized bed systems, optimal efficiency normally requires 100% bed expansion (i.e., expanding the bed during flow to twice its at-rest volume). To achieve this level of expansion with sorbent granules of preferred size, in the range of about 10 to 35 mesh, the required velocity of the upflowing stream of process solution or slurry must be on the order of 30 to 50 cm per minute. Depending upon the specific gravity and solids content of the process stream, the sorbent granules must have an effective specific gravity in the range of about 1.15 to 1.3.

There is much confusion in the art and literature in the reporting and comparison of sorbent densities or specific gravities. For example, in tabulating the physical properties of commercially available activated carbons, at least four different measures of density are often reported. These are apparent density, density as washed and drained, real density and particle density. The situation with ion exchange resins is at least as confusing as most resins swell significantly upon contact with water and many change volume substantially during the ion exchange process.

In order to avoid such confusion in this disclosure, specific gravity will be referred to in terms of effective specific gravity and defined in terms of the settling velocity of the sorbent granules in process liquids. Settling velocity of a sorbent particle in a process stream is, of course, a function of the specific gravity difference between the granule and the liquid. However, in the case of process streams containing suspended solids, viscosity also plays a very important role. In those process streams containing relatively high concentrations of suspended solids, viscosity rather than specific gravity becomes the limiting parameter on the process stream flow rate.

In this invention, sorbent granules are ballasted with finely divided particles of a magnetic, non-corrosive, iron-chromium alloy.

The alloy particles make up at least about 5% of the composite granule weight in order to provide sufficient magnetic attraction to be removed from liquid using a wet magnetic separator of moderate field intensity (e.g., 700 gauss at 30 mm from the face). The actual concentration of alloy particles in the sorbent granules is set to provide a settling velocity of the granules in the process liquid of at least about 30 cm per minute and preferably in the range of 30 to 50 cm per minute. In most applications, concentration of alloy particles in the sorbent granules will range from 5% to about 10% by weight.

The ballasted, magnetic sorbent granules are most effectively used in a multi-stage, fluidized bed contactor. A fluidized bed system permits higher throughputs per unit volume of sorbent than do fixed or moving bed systems because of the more efficient contact between the solution and sorbent granules. Ballasting the sorbent granules to adjust their effective specific gravity and achieve a settling velocity in the liquid being processed of from about 30 to 50 cm per minute optimizes the performance of a fluidized bed system and in many instances doubles the liquid throughput as compared to the same fluidized bed contactor charged with conventional sorbents. In addition, the ballasted sorbents allow extraction of metal values from process streams containing relatively high concentrations of suspended particulates. Hence, this invention allows extension of fluidized bed sorption processes to metallurgical slimes streams and pulps without the necessity for clarification or solids removal from those streams. The magnetic properties of the sorbent granules allows separation of the granules from process streams using magnetic separation techniques instead of by mechanical screening and/or sifting which causes breakage and losses of sorbent particles. Hence, overall recovery of metal values from the process streams is increased.

PREPARATION OF THE SORBENT

Ballasted sorbents are prepared by dispersing finely divided alloy particles throughout the sorbent granule. As has been set out previously, alloy particles useful in this invention must be ferromagnetic and non-corrosive in the process liquids. These required properties are satisfied by a family of iron-chromium alloys having in excess of about 11% chromium. These necessary properties are met by the martensitic and ferritic stainless steel alloys. Martensitic alloys contain some 12 to 20% chromium and displays good corrosion resistance in atmospheric, water and organic environments. Type 410, containing 12.5% chromium, 0.15% maximum carbon, with the balance iron, is a typical member of this group. Ferritic stainless steels contain 15 to 30% chromium and are generally more corrosion resistant than the martensitic alloys. Type 430, containing 16% chromium, 0.12% maximum carbon, with the balance iron, is a typical example.

The alloy powder must be in finely divided form with a maximum particle size on the order of about 150 microns. Alloy powder of appropriate particle size may be obtained by physical attrition of stock shapes as by grinding or it may be produced by any of the well known techniques for manufacturing metal powders as used in powder metallurgy.

In the manufacture of ballasted, activated carbon adsorbent granules, alloy powder may be intimately mixed with finely divided powdered charcoal to form a uniform dispersion. A binder is added together with sufficient water to form an extrudable mixture of uniform composition. The mixture may then be extruded through a multi-aperture die having holes of 1 to 2 mm in diameter. Extruded strands may be chopped to a length of 1-2 mm to form pellets or granules of suitable size. The granules are then dried and screened to remove undersize and oversize particles.

After drying and sizing, the granules are calcined at a temperature comveniently in the range of 400° to 600° C. to carbonize the binder and develop physical strength. Activation of the carbon is then accomplished in conventional fashion by treating with steam or carbon dioxide at temperatures in the range of 750° to 950° C.

Manufacture of magnetically ballasted ion exchange resins is most readily accomplished by mixing alloy particles with the resin while it is in a gelatinous state. The resin gel having alloy particles uniformly dispersed therein is then formed into beads or granules in conventional fashion.

Because of the relatively high density of iron-chromium alloys, on the order of 7.7 to 7.8 g/ml, relatively small additions of alloy powder act to substantially increase the effective specific gravity of the ballasted sorbent granule. Thus, significant increases in the effective specific gravity of the sorbent granules can be attained with little sacrifice of active sorbent area or volume.

In the case of both activated carbon adsorbents and ion exchange resins, it is necessary to incorporate a minimum of about 5% by weight of alloy powder in order to attain sufficiently high magnetic susceptibility for convenient and complete magnetic separation of the granules from process liquids. It is seldom desirable to exceed 10% by weight of alloy powder in the sorbent granule as concentrations higher than about 10% result in an unduly high effective specific gravity of the sorbent granules.

Granule size may range broadly from about 0.5 to 2 mm corresponding to a standard sieve designation of minus 10, plus 35 mesh. In most fluidized bed applications, the granule size range is preferably much narrower; minus 16, plus 20 mesh or minus 20, plus 35 mesh, for example. For the purposes of this disclosure, it is to be understood that the term "granule" includes various shapes such as cylinders, beads, spheres and the like.

THE CONTACTING PROCESS

Contacting processes suitable for and complementary to the magnetically ballasted sorbent granules will be better understood by reference to the FIGURE which schematically depicts a flowsheet for one preferred embodiment.

The process will be described in relation to the recovery of gold from a cyanide leaching process. Cyanide leaching of gold ores is, of course, very well known and the leaching, or gold dissolution, steps form no part of this invention. Briefly summarizing the process, gold ore is ground to a relatively fine state, typically 65% minus 200 mesh and is slurried in water to form a pulp. The pulp is leached using an alkaline cyanide solution with air sparging to satisfy the oxygen demand of the dissolution reaction. Gold forms a cyanide complex soluble in the aqueous leach liquor.

From the dissolution circuit, the pulp stream 10 is pumped to surge feed tank 11. Pulp stream 10 comprises a suspension of finely divided ore particles in the leach liquor and may have a solids content ranging from about 10 to more than 40 weight percent. An agitator (not shown) may be installed in tank 11 to maintain a uniform suspension.

A pulp stream is fed via conduit 12, pump 13 and second conduit 14 into the bottom of multi-stage, fluidized bed contactor 15. Contactor 15 is preferably of the type known as the NIMCIX contactor as developed by the National Institute for Metallurgy of Randsburg, South Africa. The contactor itself comprises a conical bottom section 16 surmounted by a plurality of superposed stages or beds 17a, b, c, d and e. Individual stages are separated by distribution tray 18 which typically comprises a perforated plate. Top stage 17e terminates in a flared, overflow launder 19.

Operation of contactor 15 is as follows: The contactor is charged with magnetically ballasted, activated carbon granules closely sized in the general range of minus 10, plus 35 mesh and displaying a settling velocity in the pulp feed 10 at at least about 30 cm per minute. The pregnant suspension introduced via pipe 14 flows upwardly through the stages at a velocity just under the settling velocity of the carbon granules to maintain the granules in an expanded, fluidized state occupying essentially the entire volume of each stage. Barren pulp is removed from launder 19 via conduit means 20 and is passed to waste.

After a period of forward, or upward, flow during which time adsorption takes place, the absorbent granule charge in each stage is advanced countercurrent to the liquid flow. This is accomplished by stopping the flow of pregnant pulp liquor, supplied by pipe 14, and allowing the carbon granules to settle onto the tray in each stage. After settling, a fixed volume of pulp slurry is drained from the contactor bottom via line 21. This causes a fixed volume of adsorbent granules to be removed from the contactor through line 21 and also causes a fixed volume of adsorbent granules to be transferred between stages. Thereafter, a fixed volume charge of fresh adsorbent granules from transfer vessel 22 is hydraulically lifted to the top of contactor 15 via line 23 by means of process liquid introduced into vessel 22 by way of line 24. Upon completion of adsorbent transfer, flow of pulp is resumed and contactor 15 is again operating in the adsorption mode of the cycle.

The slurry of pulp and adsorbent granules withdrawn from the contactor via line 21 is passed to magnetic separator 25. Separator 25 may conveniently comprise a wet magnetic separator having a rotating drum 26 developing a magnetic field of moderate intensity, on the order of 700 gauss at 30 mm from the drum face. Magnetic fields of such strength are easily attained by means of permanent, rather than electro, magnets. Magnetic carbon granules adhering to the drum may be washed free of adhering pulp particles by means of water spray 27. A barren pulp stream, stripped of adherent granules, is removed from the separator via line 28 and is passed to waste.

A clean carbon fraction recovered from separator 25 is passed via line 29 to transfer vessel 30. At this stage of the process, the carbon granules carry gold values ranging from a few hundred to more than one thousand ounces of gold per ton of carbon along with other heavy metal ions which form cyanide complexes, typically including silver, nickel and copper.

From transfer vessel 30, the loaded carbon granules are hydraulically conveyed via conduit 31 to elution column 32. Transfer liquid, which may conveniently be water or dilute caustic-cyanide solution, is introduced into vessel 30 by way of line 33. Column 32 may comprise a smaller version of contactor 15 including a plurality of fluidized bed stages 33a, b, c, d and e separated by distribution trays 34 and surmounted by overflow launder 35.

Eluate solution 36, preferably comprising hot, caustic-cyanide, is introduced into the bottom of column 32 and a metals-loaded eluate stream 37 is removed from the column top for further processing to recover the contained gold. Operation of column 32 is similar to that of contactor 15 as was previously described. Periodically, slugs of stripped carbon are removed from the bottom of column 32 and passed via line 38 to transfer vessel 22 for re-use in the process.

All, or a portion, of the stripped carbon removed from column 32 may be thermally reactivated prior to re-usein the process heating to a temperature ranging from about 700° to 900° C. for five to ten minutes in a rotating, inclined tube kiln or similar device.

In another embodiment of the invention, uranium is recovered from a leached ore pulp without prior separation of the ore particles from the leach solution. Stream 10 then comprises an acid-leached pulp of uranium ore containing solubilized uranium values in the leach liquor. The sorbent used in this application is an ion exchange resin of either the weak-base or strong-base type ballasted with at least 5% by weight of an iron-chromium alloy. Concentration of the ballasting alloy in the ion exchange granules is adjusted to provide a settling velocity of the granules in the pulp feed of at least 30 cm per minute and preferably in the range of 30 to 50 cm per minute. The resin charge is preferably closely sized; size ranges for example of minus 16, plus 20 mesh or minus 20, plus 35 mesh being appropriate in most applications.

Contacting of the resin-pulp is carried out in column 15 in the same manner as previously described. Loaded resin granules are then passed to contacting column 32 after magnetic separation from the barren pulp. Contactor 32 is operated as an elution column preferably using a nitrate ion-containing solution as the eluate. A concentrated eluate is removed from the column top via line 37 for uranium recovery by conventional means such as ammonia precipitation.

Use of magnetically ballasted sorbents in the invention embodiments described allows counter-current, fluidized bed extraction of metal values from ore pulps and other process streams containing relatively large concentrations of suspended solids. In addition to extending the application of fluidized bed technology to process streams heretofore inappropriate for use with this processing technique, use of magnetically ballasted granules can substantially increase the throughput of conventional fluidized bed processes. Large capital and operating cost savings are realized thereby.

In adddition to the embodiments described, other uses of the invention such as the treatment and purification of water streams will be evident to those skilled in the art.

We claim:

1. In a process wherein a liquid is contacted with solid sorbent granules in a fluidized bed to selectively capture and remove at least one constituent therefrom, the improvement comprising:
   ballasting the sorbent granules with finely divided particles of a corrosion-resistant, magnetic, iron-chromium alloy, said sorbent granules containing at least 5% by weight of said alloy particles and displaying a settling velocity in the liquid of at least 30 cm per minute.

2. The process of claim 1 wherein the sorbent granules are removed from the liquid by magnetic separation.

3. The process of claim 2 wherein said alloy contains at least about 11% chromium and wherein the concentration of alloy particles in said sorbent granules is in the range of 5% to 10% by weight.

4. The process of claim 3 wherein said sorbent is an activated carbon adsorbent and wherein the size of said granules is in the range of 10 to 35 mesh.

5. The process of claim 4 wherein said liquid is water containing finely divided particulates in suspension and wherein said removed constituent is a heavy metal ion.

6. The process of claim 3 wherein said sorbent is an ion exchange resin of the weakly basic or strongly basic type and wherein the size of said granules is in the range of 10 to 35 mesh.

7. The process of claim 6 wherein said liquid is water containing finely divided particulates in suspension and wherein said removed constitutent is a heavy metal ion.

8. A process for sorbing heavy metal ions from aqueous solution comprising:
   passing said ion-containing solution upwardly through a bed of sorbent granules at a rate sufficient to at least about double the settled volume of the granules, said granules ballasted with at least 5% by weight of finely divided particles of a corrosion resistant, iron-chromium, magnetic alloy and displaying a settling velocity in the liquid of at least about 30 cm per minute;
   periodically removing from the bottom of said bed a portion of liquid containing sorbent granules loaded with sorbed heavy metal ions and magnetically separating the sorbent granules from the liquid, and introducing a like portion of fresh sorbent granules into the top of said bed.

9. The process of claim 8 wherein said bed includes a plurality of superposed stages.

10. The process of claim 9 wherein said alloy contains at least about 11% chromium and wherein the concentration of alloy particles in said sorbent granules is in the range of 5% to 10% by weight.

11. The process of claim 10 wherein said sorbent is an activated carbon adsorbent having a granule size in the range of 10 to 35 mesh and wherein said heavy metal ions are selected from the group consisting of gold, silver and mixtures thereof.

12. The process of claim 11 wherein said aqueous solution is a cyanide-leached ore pulp containing more than 10% by weight of finely divided particulate matter.

13. The process of claim 11 wherein said magnetically separated loaded carbon granules are desorbed in a fluidized bed by contact with a hot, caustic-cyanide eluate and are thereafter again contacted with the ion-containing solution.

14. The process of claim 10 wherein said sorbent is an ion exchange resin of the weakly basic or strongly basic type having a granule size in the range of 10 to 35 mesh and wherein said heavy metal ion is uranium.

15. The process of claim 14 wherein said aqueous solution is a leached ore pulp containing more than 10% by weight of finely divided particulate material.

* * * * *